United States Patent
Lish et al.

(10) Patent No.: US 9,599,281 B1
(45) Date of Patent: Mar. 21, 2017

(54) POLE-MOUNTED LOCKING STRAP WITH ACCESSORY NUB LOCKING ATTACHMENT

(71) Applicant: Google Inc., Mountain View, CA (US)

(72) Inventors: David Frank Lish, Burlingame, CA (US); John Toccalino, Los Altos, CA (US); Ben Warren Segura, Morgan Hill, CA (US); David Anthony, Sunnyvale, CA (US); Fabien Villeneuve, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/570,026

(22) Filed: Dec. 15, 2014

(51) Int. Cl.
| | |
|---|---|
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *F16M 13/02* | (2006.01) |
| *G02B 7/00* | (2006.01) |

(52) U.S. Cl.
CPC .............. *F16M 13/02* (2013.01); *G02B 7/00* (2013.01)

(58) Field of Classification Search
CPC ........................................................ F16B 2/12
USPC ... 248/690, 693, 534, 539, 540, 541, 58, 59, 248/62, 65, 68.1, 69, 74.1, 74.5, 218.4, 248/219.1, 219.2, 219.4, 230.1, 230.3, 248/230.5, 231.41, 316.4; 24/298
See application file for complete search history.

(56) References Cited

U.S. PATENT DOCUMENTS

| | | | | |
|---|---|---|---|---|
| 1,383,062 | A * | 6/1921 | Bascome | 2/319 |
| 1,648,338 | A * | 11/1927 | Gaines | 248/539 |
| 3,305,148 | A * | 2/1967 | Zimmerman | 224/255 |
| 5,320,312 | A * | 6/1994 | Hoenninger | 248/68.1 |
| 5,370,286 | A * | 12/1994 | Newman | 224/578 |
| 5,423,281 | A * | 6/1995 | Crookham et al. | 116/173 |
| 6,330,989 | B1 * | 12/2001 | Okamoto | 248/74.1 |
| 8,132,302 | B2 * | 3/2012 | Wilkinson | 24/302 |
| 8,317,143 | B1 * | 11/2012 | Abreu | 248/218.4 |
| 8,464,990 | B2 * | 6/2013 | Flores | 248/218.4 |
| 8,870,132 | B2 * | 10/2014 | Sampson | 248/74.1 |
| 2011/0220768 | A1 * | 9/2011 | Hayes | 248/219.4 |
| 2012/0241555 | A1 * | 9/2012 | Savoye et al. | 244/54 |
| 2014/0110545 | A1 * | 4/2014 | Goett | A63B 21/0442 248/218.4 |

(Continued)

*Primary Examiner* — Terrell McKinnon
*Assistant Examiner* — Michael McDuffie
(74) *Attorney, Agent, or Firm* — Lerner, David, Littenberg, Krumholz & Mentlik, LLP

(57) ABSTRACT

Technology for securing a line, such as a fiber optic line, to a structure, such as a utility pole. In one aspect, the technology provides a mount for securing to a pole. The mount may include a body; a connector that is connectable to an apparatus by pressing together the connector and a corresponding connector of the apparatus; an arm movably attached to the body; an extension operable to move the arm into locking engagement with the body such that the body and arm encircle the pole, and to tighten the body and arm about the pole through movement of the arm; and a locking mechanism for locking the mount in a tightened position about the pole by locking the body and arm in a tightened position about the pole.

21 Claims, 5 Drawing Sheets

(56) References Cited

U.S. PATENT DOCUMENTS

2014/0259549 A1* 9/2014 Freeman et al. ............... 24/298
2015/0076303 A1* 3/2015 Ortman ..................... 248/219.4

* cited by examiner

POLE-MOUNTED LOCKING STRAP WITH ACCESSORY NUB LOCKING ATTACHMENT

BACKGROUND

Unless otherwise indicated herein, the materials described in this section are not prior art to the claims in this application and are not admitted to be prior art by inclusion in this section.

Attaching lines, such as optical fibers, coaxial cables, power lines, or other types of utility lines, to utility poles, communications poles, power poles or streetlights is difficult and dangerous due to the height of the pole or light, and expensive due to the specialized training necessary to complete the work. For example, attachment can take place in the power zone of a utility pole or in the communications zone of a utility pole, with differing requirements for the two zones and with the cost and availability of power technicians creating substantial commercial challenges. Further complicating matters are requirements that may dictate minimum crew size, relationships between crew size and the number of foreman and managers, and in the case of power zone work, the ratio of master electricians to apprentices. This confluence of labor restrictions drives up the cost of construction activities and increases the likelihood that pole attachments become a schedule gating factor in overall market deployment.

For example, the current solutions for attaching optical fiber to a pole are clunky and require multiple steps. In many cases, the current solutions utilize a bolt placed entirely though the pole to secure a fiber clamp into place via a washer and nut. In other cases, the current solutions involve placing a metal strap around the pole, securing the metal strap in one or more places with a nut and bolt, and then securing a clamp to the strap via a nut and bolt. These solutions necessitate a high degree of manual manipulation by a technician who must work from an elevated platform such as the bucket of a bucket truck. Moreover, the current solutions typically call for the use of several tools, for instance a wrench, a drill, vice grips, etc., and are man-hour intensive. The multitude of tools and extensive labor which are currently required for securing fibers to poles greatly increases the cost of such operations.

BRIEF SUMMARY

The present technology is directed towards a mount for the securing of a line or device to a pole, and in particular to a mount for attaching to a utility pole and for providing an attachment point for a fiber clamp.

The present technology was conceived in view of the drawbacks associated with current solutions for mounting lines or devices to poles. In one implementation of the technology, a mount is provided for securing a line or device to a pole, either directly or through a clamp or other apparatus. The mount may include a body; a connector that is connectable to an apparatus by pressing together the connector and a corresponding connector of the apparatus; an arm movably attached to the body; an extension operable to move the arm into locking engagement with the body such that the body and arm encircle the pole, and to tighten the body and arm about the pole through movement of the arm; and a locking mechanism for locking the mount in a tightened position about the pole by locking the body and arm in a tightened position about the pole.

The mount may also include a nub or receptacle for attaching to an aerial drone. The drone may attach to the nub or receptacle, carry the mount to a position on a utility pole, secure the mount to the pole via the extension, and then release from the mount and fly away. Such nub or receptacle may be used to secure a line or device to the mount to, in turn, secure the line or device to the pole. Further, the mount may include more than one nub or receptacle, such that one nub or receptacle may be used to secure a line or device to the mount and another nub or receptacle may be used to attach the mount to a drone.

The present technology provides numerous advantages over the prior technology. One advantage is elimination of the need to elevate a man to the pole mounting position, thereby obviating the need for elevating platforms such as a bucket truck. Further, since the mount may be attached to the pole via the extension, there is no need for tools to attach the mount to the pole. Still further, the mount may have a structure that allows a clamp or other apparatus to be attached to the mount without the use of tools. These advantages and others will be apparent in view of the following detailed description of the present technology.

DETAILED DESCRIPTION

Examples of apparatuses, systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
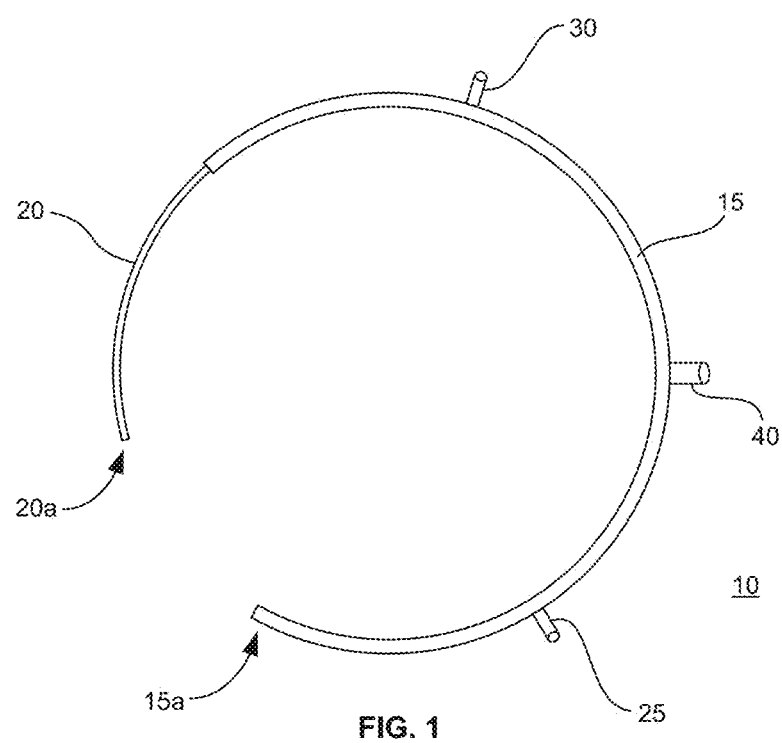
FIG. 1 is a plan view of a mount for securing to a pole.

FIG. 1 is a plan view of a mount 10 for securing to a pole. The mount 10 is semi-circular in shape, although any shape may be substituted for the semi-circular shape as dictated by the pole to which the mount will be attached. The mount 10 includes a body 15 and arm 20. The body 15 includes a connecting portion 15a at one end of the body, and the arm 20 includes a connecting portion 20a at one end of the arm. The mount 10 further includes a stabilizing pin 25, an extension 30, and a nub 40. In one implementation, the extension 30 is a pin, and nub 40 is a male type of connector that is connectable with a corresponding female type connector. However, the extension 30 is not limited to a pin, and the nub 40 is not limited to a male type connector, the wide range of embodiments for the extension and the nub being readily apparent to one skilled in the art upon viewing this disclosure. For example, nub 40 may be a female type of connector that is connectable with a corresponding male type connector. Moreover, nub 40 may take any form suitable for connection to another element or device and is not limited to male and female forms.

Figure 2A:
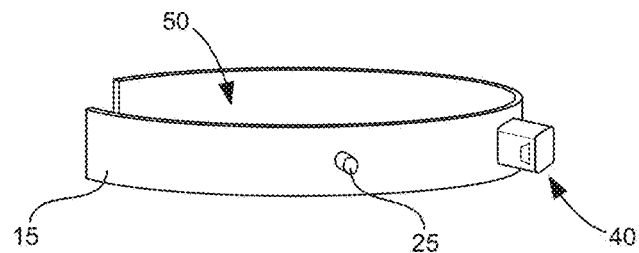
FIG. 2A is a left side elevation view of the mount of FIG. 1.

FIG. 2A is a left side elevation view of the mount 10 of FIG. 1. As can be seen from FIG. 2A, the radially inward portion of the mount 10 defines an inner surface 50 of the mount.

Figure 2B:
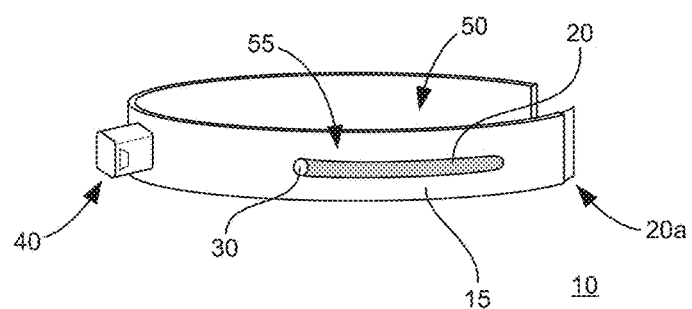
FIG. 2B is a right side elevation view of the mount of FIG. 2A.

FIG. 2B is a right side elevation view of the mount 10 of FIGS. 1 and 2A.

In one implementation, the mount 10 is attached to a utility pole by a technician who is elevated to a communications section of a utility pole. The technician arranges the mount 10 with arm 20 in a retracted position, such as a position in which arm 20 is nested within body 15. Then, when in the elevated position, the technician places the mount 10 against the pole such that inner surface 50 contacts the pole. With the mount 10 positioned against the pole, the technician grasps the extension 30 with his right hand and pushes the extension 30 away from his body until the arm 20 is extended sufficiently to have connecting portion 20a connect with connecting portion 15a. Such connection may be indicated by, for example, an audible click that is created when the connecting portion 20a connects with connecting portion 15a. In one implementation, the connecting portion 20a is formed as a male connecting portion, the connecting portion 15a is formed as a female connecting portion, and the connecting portions create a click when the male portion is inserted in the female portion.

Once the portions 20a and 15a are connected, the technician pulls the extension 30, which is attached to the arm 20 through a slot 55 in body 15, toward his body to retract the arm and thereby tighten the mount 10 about the pole. One way in which the arm 20 may be locked into the tightened position is through use of the stabilizing pin 25. In such implementation, the technician may grasp the stabilizing pin 25 with his left hand and press or turn the stabilizing pin to activate a ratcheting lock (not shown), after extending the arm 20 but before pulling the extension 30, and then pull the extension with his right hand to tighten the mount 10. The ratcheting lock insures only one way movement of the arm 20 relative to the body 15 upon tightening, thereby insuring that the mount 10 is locked in the tightened position.

Figure 2C:
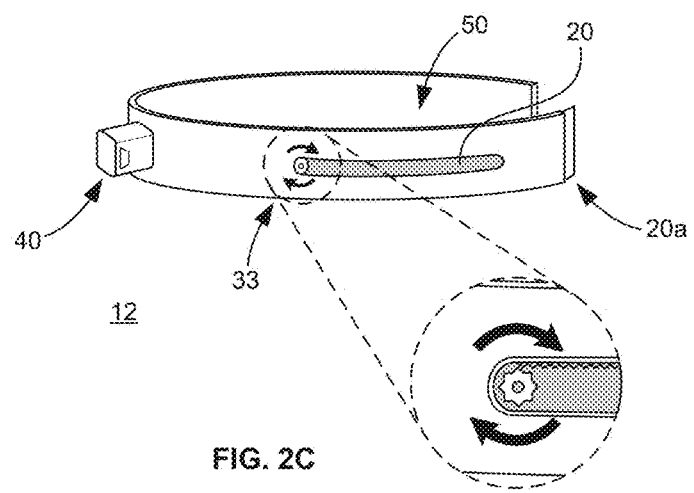
FIG. 2C is a right side elevation view of another mount implementation.

FIG. 2C is a right side elevation view of a mount 12 having an alternative extension 33. A detailed view of the extension 33 is provided in the figure. The mount 12 may be attached to a pole by a technician. To attach the mount 12 to a pole, the technician places the mount against the pole such that inner surface 50 contacts the pole. With the mount 12 positioned against the pole, the technician grasps the extension 33 with his right hand and turns the extension in the clockwise direction until the arm 20 is extended sufficiently to have connecting portion 20a connect with connecting portion 15a.

Once the portions 20a and 15a are connected, the technician may grasp the stabilizing pin 25 with his left hand and press or turn the stabilizing pin to activate a ratcheting lock (not shown). The technician may then turn the extension 33 in the counterclockwise direction to tighten the mount 12 about the pole, with the ratcheting lock insuring only one way movement of the arm relative to the body and insuring that the mount is locked in the tightened position.

It should be noted that a ratcheting lock activated by a stabilizing pin is merely one type of locking mechanism suitable for locking the mount 10 about a pole. The wide range of alternative locking mechanisms suitable for use in the embodiments will be apparent to one skilled in the art upon study of this disclosure.

Figure 3:
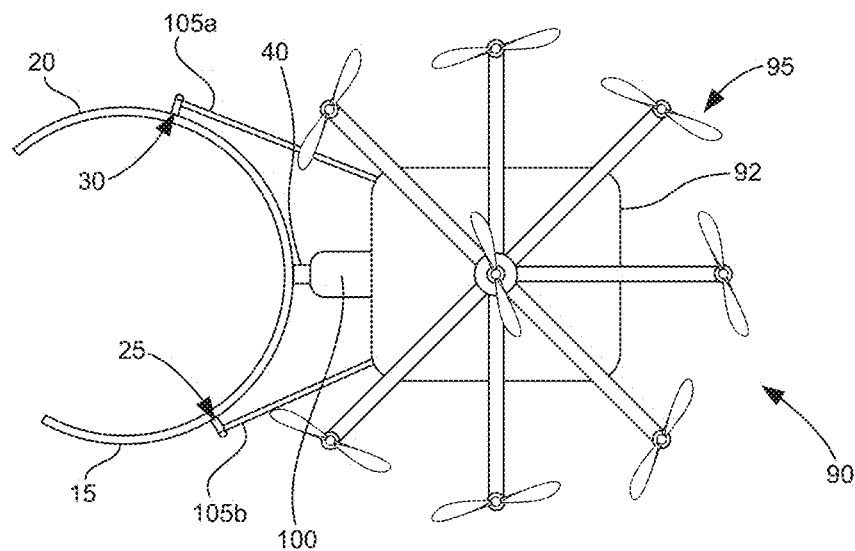
FIG. 3 is a plan view of the mount of FIG. 1 linked to an aerial drone.

Returning to mount 10 in general, in another embodiment the mount may be attached to a utility pole by a technician who remotely positions the mount on the pole via an aerial drone, such as aerial drone 90 of FIG. 3. FIG. 3 is a plan view of the mount 10 linked to the aerial drone 90.

As can be seen from FIG. 3, aerial drone 90 includes a body 92, a number of rotors 95 and a receptacle 100. The rotors are provided for lift and control of the drone 90, while receptacle 100 is provided for coupling to mount 10. The drone may include any number of rotors and any number of receptacles, and the rotors 95 and receptacle 100 are provided merely for purposes of illustration. Moreover, drone 90 need not include any rotors and may take the form of any type of aircraft, such as a balloon with one or more propellers, and drone 90 need not include one or more receptacles and may include one or more alternative attachment elements.

Drone 90 may be coupled to mount 10 by a technician who presses the nub 40 of the mount into the receptacle 100 of the drone. The technician may then use the drone 90 to fly the mount 10 to the desired position on a pole. Once the mount 10 is positioned, the drone 90 uses mechanical arms 105a and 105b to engage the extension 30 and stabilizing pin 25 and tighten the mount to the pole.

In one embodiment, the mechanical arms 105a and 105b may tighten the mount 10 to a pole by performing functions similar to those performed by a technician who manually tightens the mount. That is, once the mount 10 has been flown to a desired position on the pole, with arm 20 retracted, and is positioned such that inner surface 50 contacts the pole, mechanical arm 105a pushes the extension 30 away from the drone body 92 until the arm 20 is extended sufficiently to have connecting portion 20a connect with connecting portion 15a. Once the portions 20a and 15a are connected, mechanical arm 105a pulls the extension 30 toward the drone body 92 to retract the arm 20 and thereby tighten the mount 10 about the pole. One way in which the arm 20 may be locked into the tightened position is through use of the stabilizing pin 25. In such implementation, mechanical arm 105b presses or turns the stabilizing pin 25 to activate a ratcheting lock (not shown), after arm 20 has been extended by mechanical arm 105a but before mechanical arm 105a pulls the extension 30. Once the ratcheting lock has been activated, mechanical arm 105a pulls the extension 30 to tighten the mount 10.

It should be noted that mechanical arms 105a and 105b may be used to stabilize the mount 10 while the mount is being flown by the drone 90. More particularly, mechanical arms 105a and 105b may be respectively attached to extension 30 and stabilizing pin 25 during flight in order to provide attachment points in addition to the attachment point provided by receptacle 100. It should be further noted that mechanical arm 105b may be used, through stabilizing pin 25, to hold the mount 10 in place during tightening of the mount about a pole.

Regardless of how the mount 10 is secured to a pole, once the mount is secured the nub 40 may be used as a docking station for a clamp or other device. For instance, the nub 40 may serve as a docking station for clamp 200 of FIGS. 4A and 4B.

Figure 4A:
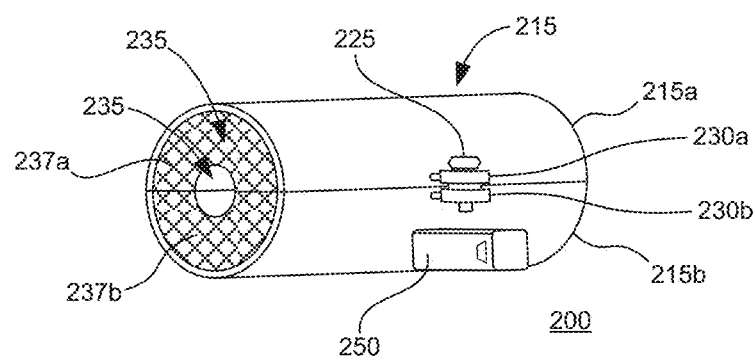
FIG. 4A is front isometric view of a single fiber clamp that may be used with the mount of FIG. 1.

FIG. 4A is front isometric view of a single fiber clamp 200 that may be used with the mount 10 of FIG. 1. As can be seen from the figure, the clamp 200 includes a body 215. The body 215 may be made up of two or more parts, and the parts may be of any shape. In the illustrative clamp 200 of the figure, the body 215 includes two parts, a first part 215a and a second part 215b, and each of parts 215a and 215b has a half cylindrical shape. The parts 215a and 215b may be hinged together by alternating hinges 220a and 220b, as shown in FIG. 4B, although alternating hinges 220a and 220b are provided solely for sake of illustration and upon reviewing this disclosure one skilled in the art will recognize many alternatives for coupling together parts 215a and 215b.

The first part 215a and second part 215b of clamp 200 may be secured to each other via a screw 225. To this end, part 215a may include a tab 230a and part 215b may include a tab 230b, the tabs 230a and 230b each having a threaded hole for accommodating screw 225. Thus, when parts 215a and 215b are secured to each other, the clamp 200 is in a closed position and the parts form a cylindrical shell. In one implementation, the parts 215a and 215b are each made of cast aluminum. Further, the clamp 200 may include a rubber grommet 235 housed with the cylindrical shell. The rubber grommet 235 may be made up of two pieces 237a and 237b as shown in FIG. 4A, or may be made up of a single piece or more than two pieces. In any event, rubber grommet 235 includes a through-hole 240 for allowing a line, such as a fiber optic line, to pass through. The rubber grommet 235 ensures optimal grip of the line while limiting the chance of damage to the line.

Clamp 200 includes a nub 250. In the depicted configuration, nub 250 protrudes from part 215b. Moreover, in the depicted configuration, nub 250 protrudes from part 215b such that the longitudinal axis of nub 250 is perpendicular to a plane that bisects both of parts 215a and 215b when the clamp 200 is in a closed position. In one implementation, nub 250 is a male type of connector that is connectable with a corresponding female type connector. However, nub 250 may be a female type of connector that is connectable with a corresponding male type connector. Moreover, nub 250 may take any form suitable for connection to another element or device and is not limited to male and female forms. In addition, regardless of type nub 250 may be connectable to another clamp having a connector that corresponds to nub 250.

Figure 4B:
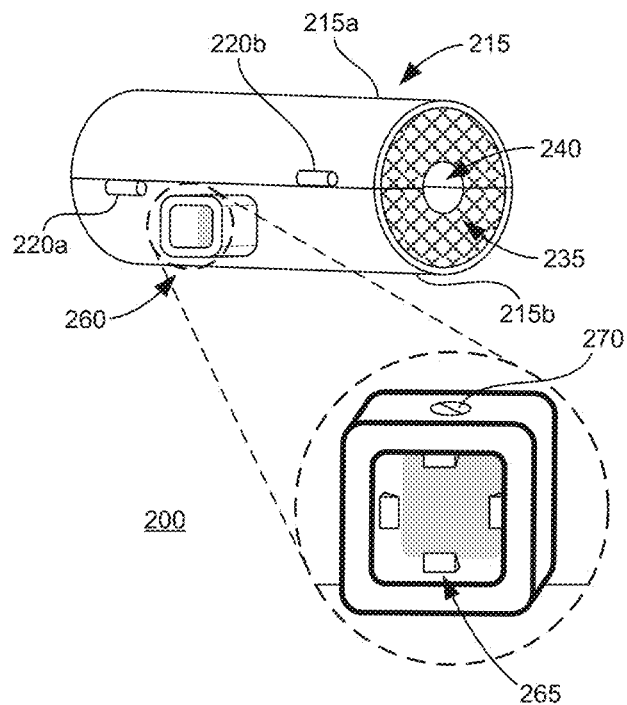
FIG. 4B is back isometric view of the single fiber clamp of FIG. 4A, including a detail view of a receptacle of the clamp.

Referring now to FIG. 4B, there is shown a back isometric view of clamp 200 of FIG. 4A, including a detail view of a receptacle 260 of the clamp. In the depicted configuration, receptacle 260 protrudes from part 215b. Moreover, in the depicted configuration, receptacle 260 protrudes from part 215b such that the longitudinal axis of receptacle 260 is perpendicular to a plane that bisects both of parts 215a and 215b when the clamp 200 is in a closed position. In one implementation, receptacle 260 is a female type of connector that is connectable with a corresponding male type connector. However, receptacle 260 may be a male type of connector that is connectable with a corresponding female type connector. Moreover, receptacle 260 may take any form suitable for connection to another element or device and is not limited to male and female forms. In addition, regardless of type, receptacle 260 may be connectable to another clamp having a connector that corresponds to receptacle 260.

In the embodiment of FIGS. 4A and 4B, nub 250 and receptacle 260 are positioned on opposite sides of a plane that bisects the clamp 200 when the clamp is in a closed position. Further, in such embodiment nub 250 and receptacle 260 are positioned on opposite sides of a plane that bisects each of part 215a and part 215b when the clamp 200 is in a closed position. Additionally, in the embodiment of FIGS. 4A and 4B nub 250 and receptacle 260 share a longitudinal axis. Nevertheless, in some embodiments, a longitudinal axis of the nub 250 and a longitudinal axis of the receptacle may be parallel without the longitudinal axis of the nub 250 and the longitudinal axis of the receptacle being the same axis.

Regarding receptacle 260, FIG. 4B shows a detailed view of one possible embodiment of the receptacle. As can be seen from the figure, the receptacle 260 may have a generally rectangular shape, and may include a multiple of teeth 265 and a receptacle locking mechanism 270. The teeth 265 may be included for purposes of engaging with a corresponding connector, such as nub 250, when such connector is pressed into receptacle 260. In this manner the teeth may secure the corresponding connector to receptacle 260, thereby snap-fitting the connector and receptacle to each other. The receptacle locking mechanism 270 may be included for purposes of locking and/or unlocking the corresponding connector to receptacle 260 after the connector has been engaged by teeth 265. In the implementation of FIG. 4B, the receptacle locking mechanism is a screw which may screw into a threaded hole on the corresponding connector.

It should be noted that each of teeth 265 and receptacle locking mechanism 270 may be used without the other. That is, receptacle 260 may include teeth 265, but not receptacle locking mechanism 270, or may include receptacle locking mechanism 270, but not teeth 265. Further, teeth 265 are merely illustrative. Upon viewing this disclosure one skilled in the art will readily appreciate the many engagement mechanisms that may be substituted for teeth 265. Similarly, receptacle locking mechanism 270 need not include a screw, and upon viewing this disclosure one skilled in the art will readily appreciate the many alternative forms for receptacle locking mechanism 270.

Clamp 200 may be coupled to nub 40 of mount 10 by pressing receptacle 260 onto nub 40. The coupling of nub 40 to receptacle 260 may be performed with or without use of an aerial drone. That is, the clamp 200 may be secured to the mount 10 by a technician using his hand to press receptacle 260 onto nub 40, or by a technician flying the clamp 200 to the mount 10 using drone 90 and then directing the drone so as to press receptacle 260 into nub 40.

Figure 5:
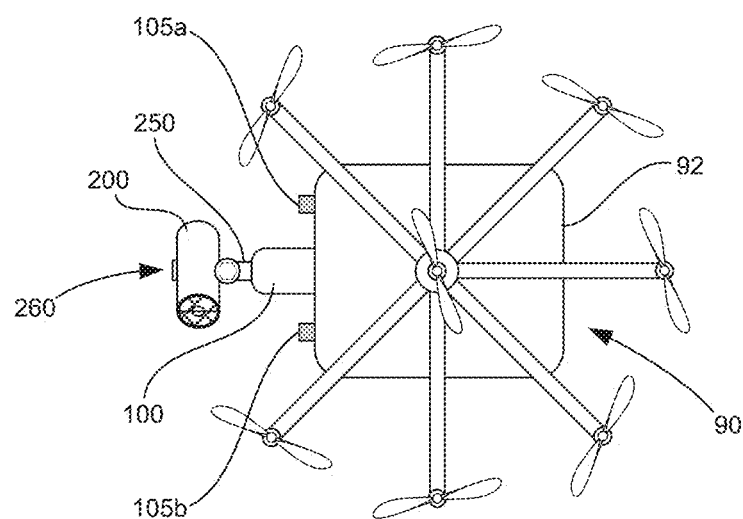
FIG. 5 is a plan view of the clamp of FIGS. 4A and 4B linked to the aerial drone of FIG. 3.

FIG. 5 is a plan view of the clamp 200 of FIGS. 4A and 4B linked to the aerial drone 90 of FIG. 3. As can be seen from FIG. 5, drone 90's mechanical arms 105a and 105b may be retractable, and FIG. 5 shows the mechanical arms in a retracted position. The receptacle 100 of drone 90 couples to clamp 200 via nub 250 of the clamp. Once the clamp 200 is secured to the drone 90 the drone can carry the clamp to a desired destination, such as mount 10 attached to a utility pole.

In addition, it should be noted that in another implementation a clamp and a mount may be connected to each other to form a connected unit and then flown to a desired position on a pole as such unit. For example, clamp 200 could be coupled to mount 10 by pressing receptacle 260 of the clamp onto nub 40 of the mount to form a unit. The unit could, in turn, be coupled to drone 90 by pressing receptacle 100 of drone 90 onto nub 250 of clamp 200, and the drone could then be used to remotely position the unit on the pole and attach the unit to the pole using mechanical arms.

As an optional feature, any of the nubs, receptacles, or other connectors on mount 10, drone 90, and clamp 200 may actuate. Such actuation may be provided for purposes of accommodating shear forces. For example, receptacle 260 on clamp 200 may actuate in a plane that includes the longitudinal axis of the receptacle 260. Further, receptacle 260 may actuate in a plane that that includes the longitudinal axis of the receptacle and is parallel to the longitudinal axis of through-hole 240. The amount and direction of actuation may be varied in accordance with the desired application of the clamp 200. For instance, receptacle 260 may actuate in a range of −7.5 degrees to +7.5 degrees in a plane that that includes the longitudinal axis of the receptacle and is parallel to the longitudinal axis of through-hole 240. Also, actuation need not be limited to only one nub on a clamp or only one receptacle on a clamp. For example, each of receptacle 260 and nub 250 on clamp 200 may actuate.

In another example, the nub 40 of mount 10 may actuate in a plane that includes the longitudinal axis of the nub. Further, nub 40 may actuate in a plane that that includes the longitudinal axis of the nub and is perpendicular to the longitudinal axis of a pole to which the mount 10 is attached. The amount and direction of actuation may be varied in accordance with the desired application of the mount 10. For instance, nub 40 may actuate in a range of −7.5 degrees to +7.5 degrees in a plane that that includes the longitudinal axis of the nub and is perpendicular to the longitudinal axis of a pole to which the mount 10 is attached.

In any event once a clamp such as clamp 200 is attached to the mount 10, a line, such as a fiber optic line, may be secured within the clamp.

The present technology may be configured as follows.

1) A mount for securing to a pole, including: a body; a connector that is connectable to an apparatus by pressing together the connector and a corresponding connector of the apparatus; an arm movably attached to the body; an extension operable to move the arm into locking engagement with the body such that the body and arm encircle the pole, and to tighten the body and arm about the pole through movement of the arm; and a locking mechanism for locking the mount in a tightened position about the pole by locking the body and arm in a tightened position about the pole.

2) The mount according to 1, wherein the connector of the mount includes a nub.

3) The mount according to 1 or 2, wherein the nub is connectable to a receptacle on a clamp by snap-fitting the nub and the receptacle to each other.

4) The mount according to any of 1 to 3, wherein the connector of the mount includes a receptacle.

5) The mount according to any of 1 to 4, wherein the receptacle is connectable to a nub on a clamp by snap-fitting the receptacle and the nub to each other.

6) The mount according to any of 1 to 5, wherein the mount further includes a stabilizing pin for activating the locking mechanism.

7) The mount according to any of 1 to 6, wherein the locking mechanism includes a ratcheting lock that allows only one way movement of the arm relative to the body.

8) The mount according to any of 1 to 7, wherein the connector of the mount includes a male type connector, and is connectable to a female type receptacle on an aerial drone.

9) The mount according to any of 1 to 8, wherein the connector of the mount includes a female type connector, and is connectable to a male type connector on an aerial drone.

10) The mount according to any of 1 to 9, wherein the connector of the mount is connectable to a clamp that includes a corresponding connector for connecting to the mount and at least one other connector that is connectable to at least one of an aerial drone or a clamp.

11) The mount according to any of 1 to 10, wherein the apparatus is one of an aerial drone or a clamp.

12) The mount according to any of 1 to 11, wherein the apparatus is a clamp for securing a fiber optic line.

13) A method for securing an article to a pole, including: securing a mount to the pole by extending an arm of the mount into locking engagement with a body of the mount; tightening the mount about the pole by moving the arm relative to the body; locking the mount in a tightened position about the pole by locking the arm and body in a tightened position about the pole; and attaching the article to the mount by snap-fitting a connector on the mount to a corresponding connector on the article.

14) The method according to 13, wherein securing the mount to the pole includes using an aerial drone to secure the mount to the pole.

15) The method according to 13 or 14, wherein attaching the article to the mount includes using an aerial drone to attach the article to the mount.

16) The method according to any of 13 to 15, wherein the article is a clamp.

17) The method according to any of 13 to 16, wherein the clamp includes a corresponding connector for connecting to the connector of the mount and at least one other connector that is connectable to the aerial drone.

18) The method according to any of 13 to 17, wherein the clamp is configured to secure a fiber optic line.

19) The method according to any of 13 to 18, wherein the step of locking includes using a stabilizing pin to activate a locking mechanism.

20) A method for securing a mount to a pole, including using an aerial drone to extend an arm of the mount into locking engagement with a body of the mount, tighten the mount about the pole by moving the arm relative to the body, and lock the mount in a tightened position about the pole by locking the arm and body in a tightened position about the pole.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A mount for securing to a pole, comprising:
a body having a first end and a second end:
a connector that is connectable to an apparatus by pressing together the connector and a corresponding connector of the apparatus;
an arm movably attached to the body such that the arm can be extended away from the first end of the body towards the second end, and retracted into the first end of the body, wherein when the arm is retracted into the first end of the body it is at least partially nested within the body;

an extension operable to move the arm into locking engagement with the second end of the body such that the body and arm encircle the pole, and to tighten the body and arm about the pole through retraction of the arm; and a locking mechanism for locking the mount in a tightened position about the pole by restricting movement of the arm.

2. The mount as recited in claim 1, wherein the connector of the mount comprises a nub.

3. The mount as recited in claim 2, wherein the nub is connectable to a receptacle on a clamp by snap-fitting the nub and the receptacle to each other.

4. The mount as recited in claim 1, wherein the connector of the mount comprises a receptacle.

5. The mount as recited in claim 4, wherein the receptacle is connectable to a nub on a clamp by snap-fitting the receptacle and the nub to each other.

6. The mount as recited in claim 1, wherein the mount further comprises a stabilizing pin for activating the locking mechanism.

7. The mount as recited in claim 1, wherein the locking mechanism comprises a ratcheting lock that allows only one way movement of the arm relative to the body.

8. The mount as recited in claim 1, wherein the connector of the mount comprises a male type connector, and is connectable to a female type receptacle on an aerial drone.

9. The mount as recited in claim 1, wherein the connector of the mount comprises a female type connector, and is connectable to a male type connector on an aerial drone.

10. The mount as recited in claim 1, wherein the connector of the mount is connectable to a clamp that comprises a corresponding connector for connecting to the mount and at least one other connector that is connectable to at least one of an aerial drone or a clamp.

11. The mount as recited in claim 1, wherein the apparatus is one of an aerial drone or a clamp.

12. The mount as recited in claim 1, wherein the apparatus is a clamp for securing a fiber optic line.

13. A method for securing an article to a pole, comprising securing a mount to the pole by moving an arm of the mount away from a first end of a body of the mount into locking engagement with a second end of the body of the mount;

tightening the mount about the pole by retracting a portion of the arm towards the first end of the body;

locking the mount in a tightened position about the pole by locking the arm and body in a tightened position about the pole; and attaching the article to the mount by snap-fitting a connector on the mount to a corresponding connector on the article.

14. The method as recited in claim 13, wherein securing the mount to the pole comprises using an aerial drone to secure the mount to the pole.

15. The method as recited in claim 13, wherein attaching the article to the mount comprises using an aerial drone to attach the article to the mount.

16. The method as recited in claim 13, wherein the article is a clamp.

17. The method as recited in claim 16, wherein the clamp comprises a corresponding connector for connecting to the connector of the mount and at least one other connector that is connectable to the aerial drone.

18. The method according to claim 16, wherein the clamp is configured to secure a fiber optic line.

19. The method according to claim 13, wherein the step of locking comprises using a stabilizing pin to activate a locking mechanism.

20. A method for securing a mount to a pole, comprising using an aerial drone to move an arm of the mount, relative to a body of the mount, into locking engagement with the body of the mount, the arm being extended from a first end of the body towards a second end of the body, tighten the mount about the pole by retracting the arm towards the first end of the body, and lock the mount in a tightened position about the pole by locking the arm and body in a tightened position about the pole.

21. The mount of claim 1, wherein the arm is slidable with respect to the body, such that a distal end of the arm slides toward a free end of the body.

* * * * *